May 26, 1925.
D. SPAHN
1,539,441
HARROW STRUCTURE
Filed Aug. 27, 1924
2 Sheets-Sheet 1
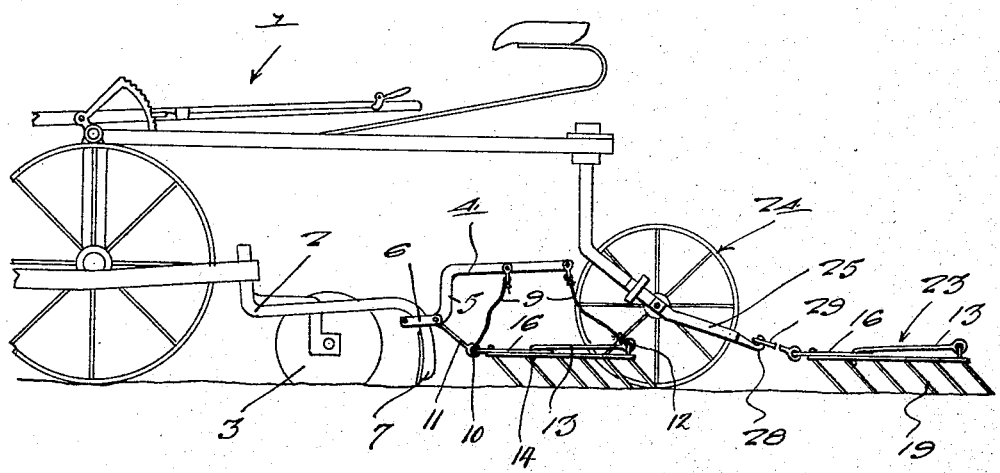
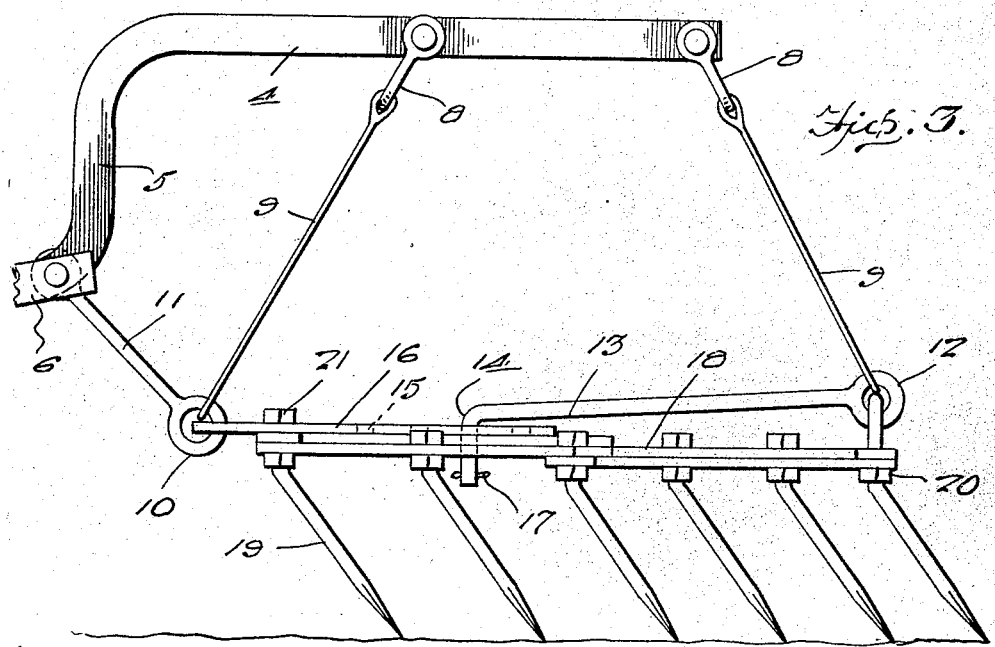
Inventor
David Spahn
By Clarence A. O'Brien
Attorney

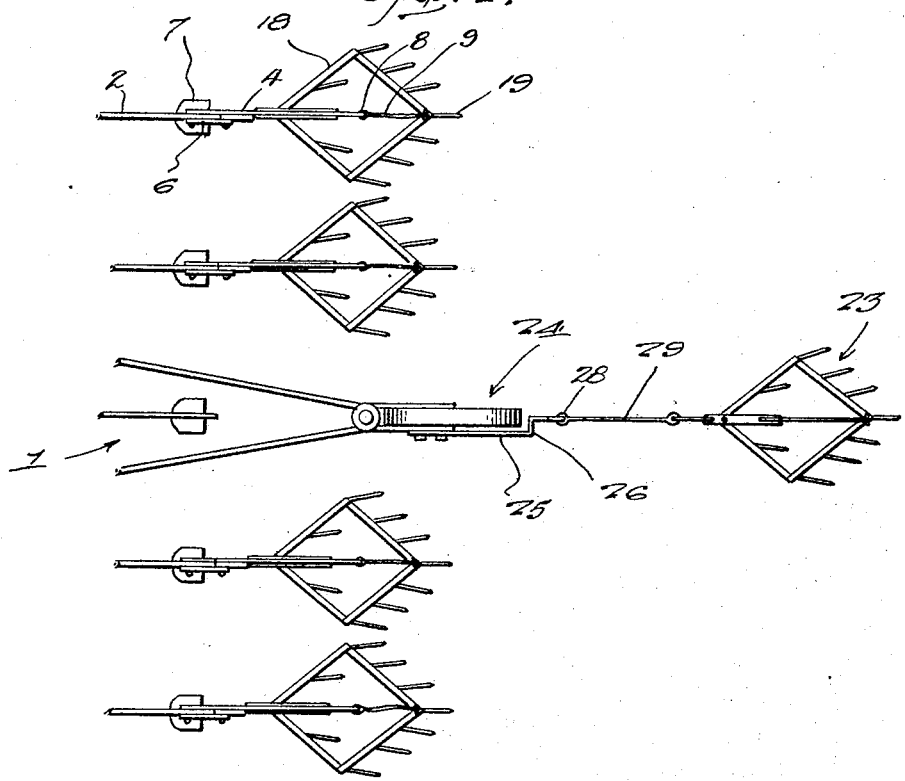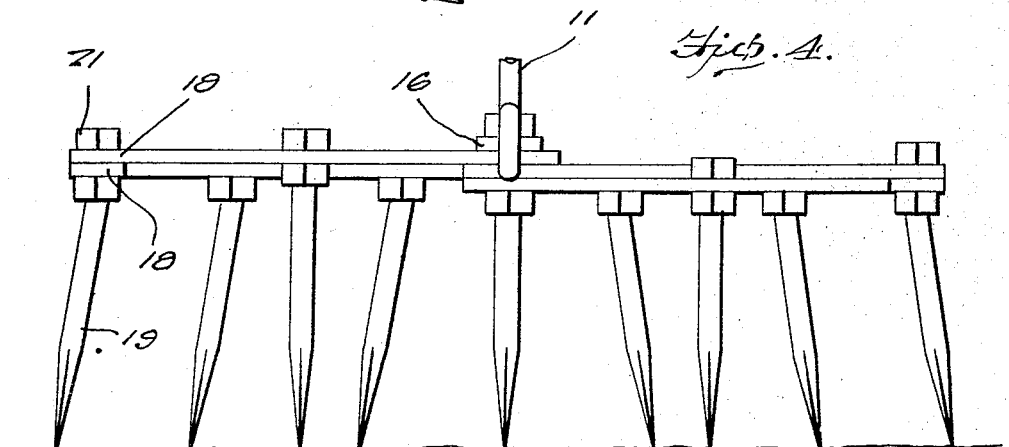

Patented May 26, 1925.

1,539,441

UNITED STATES PATENT OFFICE.

DAVID SPAHN, OF WHEATLAND, WYOMING.

HARROW STRUCTURE.

Application filed August 27, 1924. Serial No. 734,456.

*To all whom it may concern:*

Be it known that I, DAVID SPAHN, a citizen of the United States, residing at Wheatland, in the county of Platte and State of Wyoming, have invented certain new and useful Improvements in a Harrow Structure, of which the following is a specification.

This invention relates to an improved harrow structure which I have devised for use in conjunction with a conventional cultivator. The invention is in the form of an attachment capable of being applied to the existing parts of such a cultivator without requiring alterations and the several harrow units which it includes are arranged in the proper position to drag between the rows in rear of the cultivating disks and plows.

It is my object to provide a cultivator structure wherein the cultivating units are so designed as to pulverize the clods of the dirt and to uniformly spread this pulverized dirt or soil in the otherwise irregular channels formed.

It is a feature of the invention to support the cultivator units from the liftable cultivator disk frame so that the units will be simultaneously raised from the ground with the latter.

Another and important feature is derived from the provision of cultivator units in the form of diamond shaped frames provided with drag teeth arranged in a manner to obtain a uniform spread of the soil, the frames themselves being collapsible to permit the length and width to be varied according to the area in which they must be confined. I also propose to provide a front row of harrow units to travel in back of the cultivator disks and to provide a central unit to travel in rear of the caster wheel so that no part of the path will be left unturned.

Other features and advantages of the invention will become apparent from the following description and drawings.

In the drawings:—

Figure 1 is a side elevation of a portion of a conventional form of cultivator showing my improved harrow structure in association therewith.

Figure 2 is a top plan view of the harrow structure.

Figure 3 is an enlarged side elevation of one of the harrow units.

Figure 4 is a front elevation of one of the toothed drags included in each unit.

Figure 5 is a detail perspective view of a hitching bar for the supplemental unit.

Referring to the drawings in detail, the reference character 1 designates generally, a conventional form of cultivator including a supporting frame 2 for a plurality of harrow disks 3. As seen in Figure 2, I propose to form a transverse row of the so called cultivator units. Each unit comprises a connection bar 4, downturned at its forward end as at 5 and bolted, clamped or otherwise secured as at 6 to the downturned portion of one of the cultivating plows 7. A pair of clevises 8 are attached to the bar 4 and flexible elements 9 are connected to and depend from these. At its lower end, the forward flexible connection is connected to the eye 10 on the lower end of the link 11. The corresponding end of the rear connector is connected to an eye 12 formed on the rear end of an adjusting and retaining rod 13 having the downturned front end 14 passed selectively through one of the apertures 15 in the complemental adjusting strip 16. The parts are maintained in set position by a cotter pin or key 17. The rod 13 and plate 16 afford an adjustable connection between the front and rear points of a collapsible frame comprising a part of the toothed drag. As seen in top plan view, the frame is diamond shaped and is composed of a plurality of bars 18 having their ends arranged in overlapping relation and pivotally connected together by a predetermined one of the rearwardly inclined teeth 19. If desired, the teeth may be formed at the top with shoulders 20 abutting the under sides of the bars and may have threaded shanks passing through the bars with nuts 21 on the ends of the shanks. It will thus be seen that the same means that serve to connect the teeth to the frame also serve to afford means whereby the frame may be adjusted in width or length to traverse in wide or narrow paths. Obviously, when the frame is adjusted, it is maintained in such adjusted position by the parts 13 and 16. It is also clear that when the plows 7 are lifted, the harrow elements are simultaneously lifted. Observing Figure 2 it will be seen that I propose to use two or three teeth at the front of the frame with a multiplicity of teeth at the rear of the frame. This arrangement permits the front teeth to break up the clods of dirt, after which the rear teeth come along to spread the particles of dirt in a uniform manner. All of the harrow units are of duplicate construction and the foregoing description applies thereto.

I wish to direct attention to the fact that I utilize a supplemental harrow unit 23 to travel behind the row of units. This is disposed directly behind the caster wheel 24 of the cultivator to insure cultivation for the full width of the machine. In attaching this supplemental harrow, I provide a bar of the shape seen in Figure 5, the bar being referred to by the character 25 and being shaped for attachment to one of the arms of the usual caster wheel fork. The rear end of the bar 25 is directed laterally as at 26 and then into parallelism with the body portion as at 27, the free end being provided with a hook 28 to which a flexible connection 29 is connected.

The method of the use having been made apparent by the foregoing description and drawing, I do not believe that it is necessary to enter a more lengthy description.

Having thus described the invention, what I claim is:—

In a harrow structure of the class described, a collapsible diamond shaped frame, rearwardly inclined teeth carried by said frame, a plate attached to the forward end of the frame and extending into the interior thereof and provided with apertures, a rod connected to the rear end of the frame and extended into the interior and having a down turned end adapted to be selectively engaged with the apertures in said plate.

In testimony whereof I affix my signature.

DAVID SPAHN.